United States Patent
Serkh et al.

(10) Patent No.: US 7,552,705 B2
(45) Date of Patent: Jun. 30, 2009

(54) VEHICLE STOP/START SYSTEM WITH REGENERATIVE BRAKING

(75) Inventors: Alexander Serkh, Troy, MI (US);
Imtiaz Ali, Lathrup Village, MI (US);
Dragan Kosanovic, Warren, MI (US)

(73) Assignee: The Gates Corporation, Denver, CO (US)

( * ) Notice: Subject to any disclaimer, the term of this patent is extended or adjusted under 35 U.S.C. 154(b) by 18 days.

(21) Appl. No.: 11/715,152

(22) Filed: Mar. 7, 2007

(65) Prior Publication Data
US 2008/0217083 A1  Sep. 11, 2008

(51) Int. Cl.
*F02N 11/04* (2006.01)
*B60K 6/20* (2007.10)
*B61D 27/00* (2006.01)
*B60H 1/22* (2006.01)

(52) U.S. Cl. ............... 123/179.4; 180/65.21; 180/65.31; 165/42; 165/202

(58) Field of Classification Search ............... 123/179.3, 123/179.4, 142.5 E; 180/165, 65.1, 65.2, 180/65.3, 65.8; 60/698, 716
See application file for complete search history.

(56) References Cited

U.S. PATENT DOCUMENTS

| | | | |
|---|---|---|---|
| 6,362,536 B1 | 3/2002 | Izumiura et al. | 290/40 C |
| 6,595,895 B2 | 7/2003 | Suzuki et al. | 477/3 |
| 6,945,905 B2 | 9/2005 | Tamai et al. | 477/3 |
| 7,336,002 B2 * | 2/2008 | Kato et al. | 307/10.6 |
| 7,347,175 B2 * | 3/2008 | Lupo et al. | 123/179.4 |
| 2003/0217876 A1 * | 11/2003 | Severinsky et al. | 180/65.2 |
| 2006/0000593 A1 * | 1/2006 | Schlecht et al. | 165/202 |

* cited by examiner

*Primary Examiner*—Michael Cuff
*Assistant Examiner*—Ka Chun Leung
(74) *Attorney, Agent, or Firm*—J. A. Thurnau, Esq.; J. L. Mahurin, Esq.; P. N. Dunlap, Esq.

(57) ABSTRACT

A vehicle engine stop/start system with regenerative braking comprising a main engine for powering a vehicle having an accessory belt drive system, a motor/generator engaged with the accessory belt drive system, an operator activated switch for selecting an operating mode, in a first operating mode an electric energy storage portion for providing electric power to a heating system when the main engine is off, a relay for preventing operation of the heating system when the main engine is running, in a second operating mode the electric energy storage portion providing electric power to the motor/generator whereby the motor/generator drives an air conditioning compressor when the main engine is off, the air conditioning compressor connected to the accessory belt drive system, a relay for preventing operation of the air conditioning compressor using the motor/generator when the main engine is running, in a third operating mode the motor/generator is used to start the main engine after the main engine has been automatically stopped, and in a fourth operating mode during operation of the main engine the motor/generator generates an electric current during vehicle braking whereby the electric energy storage portion is recharged.

7 Claims, 7 Drawing Sheets

VEHICLE STOP/START SYSTEM WITH REGENERATIVE BRAKING

FIELD OF THE INVENTION

The invention relates to a vehicle stop/start system integrated with an auxiliary power unit and having regenerative braking.

BACKGROUND OF THE INVENTION

It is known that auxiliary power systems (APU) can by used to reduce or eliminate truck idling by providing a power source other than the main engine which operates the vehicle systems when the truck is not in motion. Hybrid vehicle electric systems can be used to reduce or eliminate engine idling during traffic stops. Regenerative braking can be used to further improve fuel consumption by providing a means of recharging an onboard electric energy storage system. It is also known that a stop-start function can be achieved by utilizing the existing starter of the engine to restart the engine after a stop period, for example, at a stop light.

Representative of the art is U.S. Pat. No. 7,013,646 to Serkh which discloses an auxiliary power system for a motor vehicle primary engine used to drive primary engine accessories when the primary engine is not operating. The system comprises a secondary engine that drives a hydraulic pump. The hydraulic pump is connected to a hydraulic motor. The hydraulic motor is integrated with an accessory belt drive system on a primary engine. The secondary engine drives the ABDS system through the hydraulic pump and hydraulic motor when the primary engine is not operating, thus allowing various primary engine accessories such as air conditioning to be operated while the primary engine is off. A one-way clutch on the primary engine crankshaft prevents the primary engine crankshaft from being turned when the hydraulic motor is driving the belt. A one-way clutch on the hydraulic motor prevents it from being driven when the primary engine is in operation.

What is needed is a vehicle stop/start system integrated with an auxiliary power unit and having regenerative braking.

SUMMARY OF THE INVENTION

The primary aspect of the invention is to provide a vehicle stop/start system integrated with an auxiliary power unit and having regenerative braking.

Other aspects of the invention will be pointed out or made obvious by the following description of the invention and the accompanying drawings.

The invention comprises a vehicle engine stop/start system with regenerative braking comprising a main engine for powering a vehicle having an accessory belt drive system, a motor/generator engaged with the accessory belt drive system, an operator activated switch for selecting an operating mode, in a first operating mode an electric energy storage portion for providing electric power to a heating system when the main engine is off, a relay for preventing operation of the heating system when the main engine is running, in a second operating mode the electric energy storage portion providing electric power to the motor/generator whereby the motor/generator drives an air conditioning compressor when the main engine is off, the air conditioning compressor connected to the accessory belt drive system, a relay for preventing operation of the air conditioning compressor using the motor/generator when the main engine is running, in a third operating mode the motor/generator is used to start the main engine after the main engine has been automatically stopped, and in a fourth operating mode during operation of the main engine the motor/generator generates an electric current during vehicle braking whereby the electric energy storage portion is recharged.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The invention provides an auxiliary power system for trucks, and in particular, for trucks equipped with hybrid electric systems and auxiliary power systems. The arrangement of the major components of the inventive system is shown above in FIG. 1. A control schematic is illustrated in FIG. 2.

The same auxiliary power unit system used for the reduction of overnight idling can also be used to eliminate workday idling and idling during driving. Workday idling comprises those periods when the vehicle has to idle for unloading or loading, during breaks for driver meals, during traffic jams, and so on. Idling during driving will be those periods spent at traffic lights, stop-and-go traffic, and so on. In an alternate embodiment a scaled down version of the components mentioned above (i.e. using only four batteries instead of eight batteries) can be used for the sole purpose of start/stop for vehicles that are not long haul and, therefore, have no need for anti idling systems that provide heating, cooling, and electrical power for extended periods when the main engine is not operating.

A control system is required to coordinate the functioning of all the major components that make up the start stop system. The system functions as follows.

When a driver needs to idle the vehicle the driver will initiate the start/stop system by pressing a button in the vehicle cab. Pressing the button will cut power to the ignition system by disconnecting the run circuit, thereby stopping the main engine. In addition, the crank circuit is disconnected to prevent the driver from starting the main engine with an ignition key while the start/stop system is active. If the air condition (AC) system is on before the main engine is turned off, it will continue to run during the engine shut down period.

To accomplish this a motor/generator is enabled as a motor to propel the AC compressor through the ABDS serpentine belt to deliver cool, conditioned air to the cabin from the selected HVAC module.

Since there will be electrically large battery packs on board the vehicle as part of the system, the AC compressor will be easily driven during daytime idling periods and the idling during driving by the batteries.

If the heater is on during an engine shut down period an auxiliary coolant pump will continue to circulate the hot coolant to the selected heater core. If the shut down period is sufficiently long and the coolant temperature falls below a predetermined level, a fuel fired heater will automatically start up to heat the coolant.

When the driver is ready to continue driving, the vehicle can be restarted with a simple push of the start button. This sends a signal to a supervisory controller. Through various relays the supervisory controller reconnects the run circuit and the engine crank circuit. A dedicated engine controller will be signaled to commence the main engine starting process. The engine controller will send power to the crank circuit and to the starter solenoid. This will engage the starter, and, after some cranking duration or a speed limit as been surpassed (which ever comes first), the signal is removed from the solenoid to end the cranking process.

If the engine is then started, the engine controller will enter an engine monitoring phase to make sure the engine continues to run. If the engine fails to start, the driver can try starting again by repressing the start button to repeat the process described above.

Figure 1:
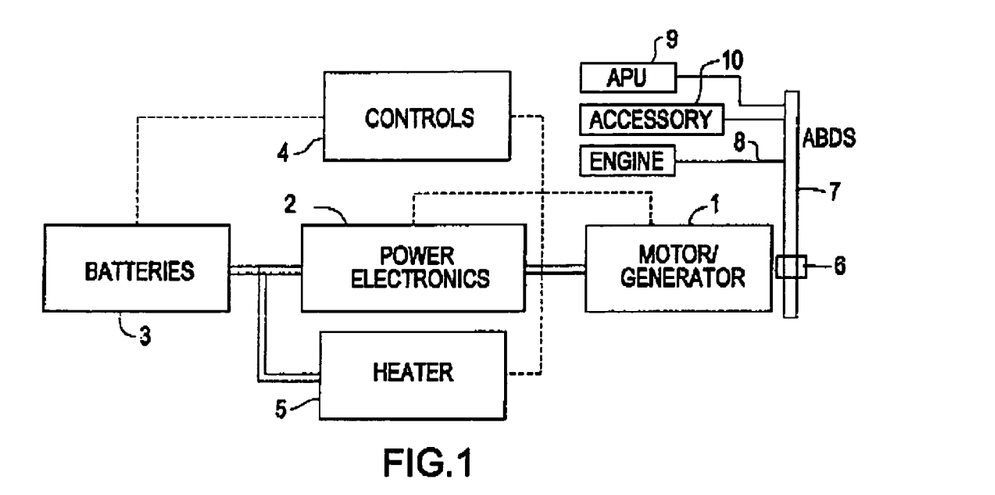
FIG. 1 is a general arrangement schematic.
Figure 2:
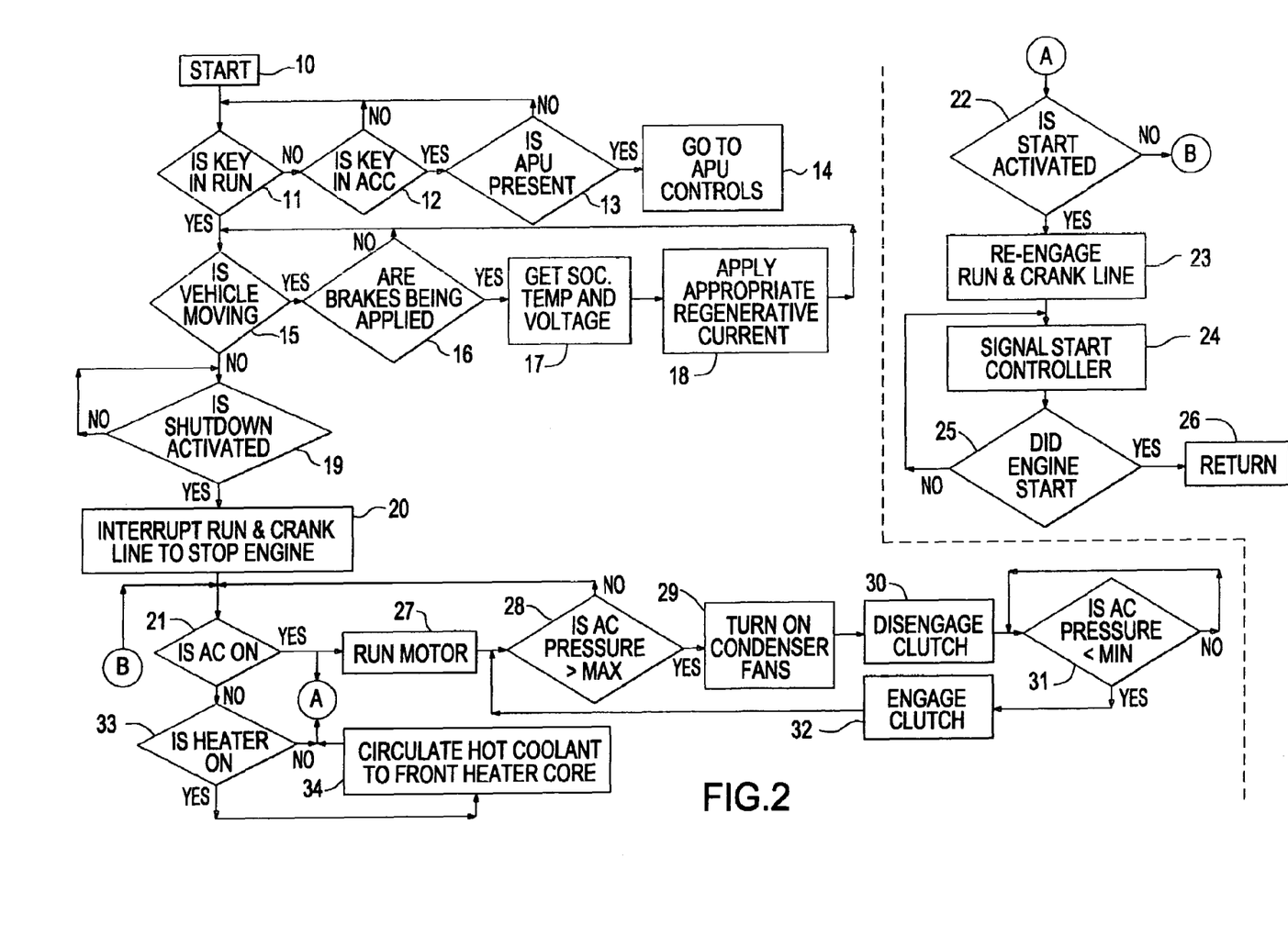
FIG. 2 is a control schematic.

Referring to FIG. 1 the system generally comprises a motor/generator 1 and other components. Motor/generator 1 is mounted with the main engine and is engaged with the engine asynchronous belt drive system (ABDS) 5. The ABDS comprises engine driven accessories 10 driven by belt 7 as is known in the art, including air conditioning compressor and water pump, for example. A belt 7 is trained between each of the accessories. The belt is engaged with and is driven by the engine crankshaft 8. An auxiliary power unit 9 is engaged with belt 7 as well.

The motor/generator 5 is also engaged with the ABDS belt. The motor/generator is controlled by and connected to the power electronics 2. Batteries 3 are connected to the motor/generator 1 and heater 5. The batteries and heater are controlled by controls 4.

FIG. 2 is a control schematic for the system. In general, schemes for two systems are illustrated. They are operation of the auxiliary power system-start/stop system and operation of the regenerative braking.

Beginning with start 10, the query is whether the key is in run in the ignition 11. If "no" then the query is whether the key is in the accessory (ACC) position 12. If "yes" then the system determines if the auxiliary power unit is present 13. If "yes" and the auxiliary power unit is present then the system begins operation of the auxiliary power unit. An auxiliary power unit (APU) suitable for this service is disclosed in U.S. Pat. No. 7,013,646 incorporated herein in its entirety be reference.

Returning to key status 11, if the key is in the run position, then the system queries whether the vehicle is moving 13. If "yes" the system next determines whether the brakes are applied 16. If "yes" the system determines battery state of charge (SOC), temperature and voltage 17 of the batteries 3. It then applies the appropriate regenerative braking current to the batteries. At this point the motor/generator 4 operates in the generator mode thereby recharging batteries 3.

Returning to vehicle status 13, if the vehicle is not moving then the system determines whether shutdown is activated 19. If "no" then vehicle operation continues. If "yes" then the engine is shut down 20. This is the "stop" of the idle stop/start sequence.

Once the engine is stopped, the system determines whether the air conditioning (A/C) is on 21. If "yes" then motor/generator 1 is energized and operated as a motor 27. This has the effect of driving the ABDS as described previously, which in turn drives the AC compressor on the ABDS system.

This leads to a control loop for the air conditioning system as it is driven by the motor 1. The system determines whether the AC coolant pressure is at a maximum 28. If "yes" then the condenser fan is activated 29 and the AC compressor clutch is disengaged 30. The AC system pressure then decreases until the system set point commands the AC compressor clutch to reengage 32. This loop continues for as long as the answer to 21 is "yes".

In combination with the AC loop is the parallel loop relating to the engine operation status. The system determines whether the start command is present 22. The start command is indicated by a momentary push button. If "yes" then the Run and Crank lines are re-engaged. The start controller is then signaled to start the engine 24. This is the "start" of the stop/start sequence.

If engine start is confirmed 26 then the system returns to normal operation with the engine ABDS driving the motor/generator 1 in generate mode thereby recharging the batteries 3.

Returning to AC status 21, if the AC is not "on", then the heater status is queried 33. If the heater is "on" then the system circulates hot coolant to the cab heater core 34. If the heater is not "on" then the system determines if an engine start is requested 22. The start loop is as described previously.

Figure 3A:
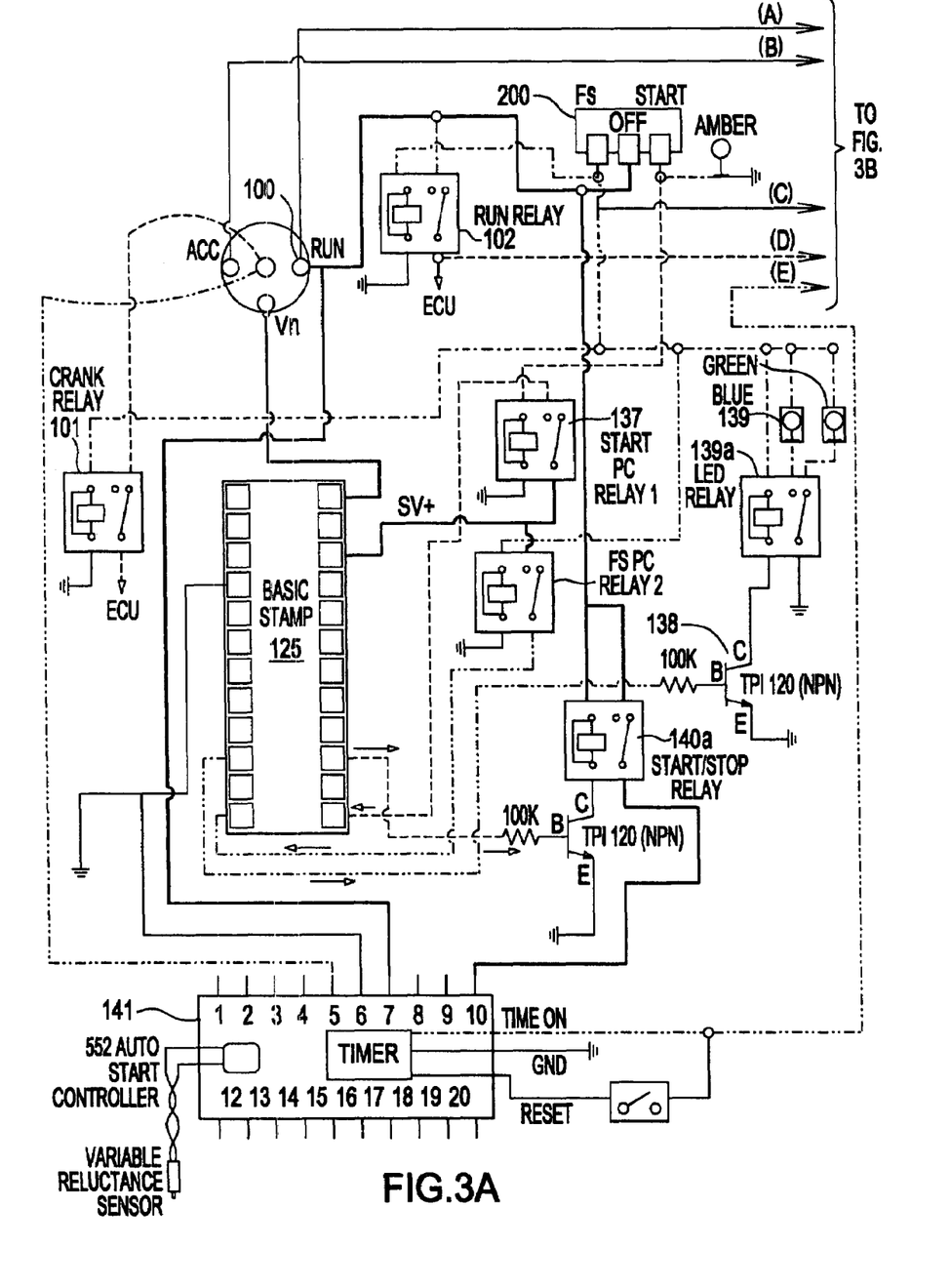
FIG. 3 is an electrical schematic.
Figure 3B:
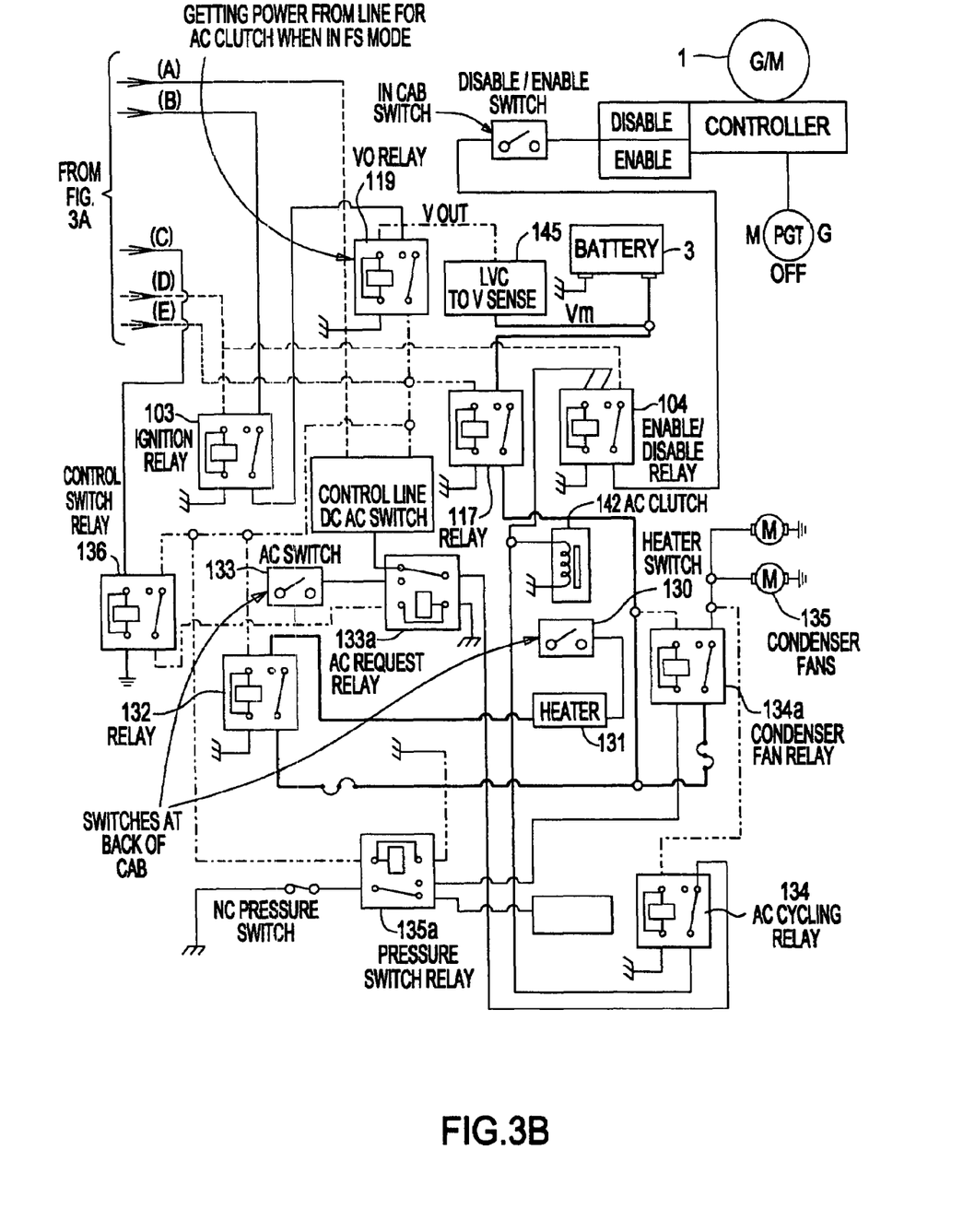

FIG. 3 is an electric schematic of the system. The inventive system is shown integrated into an 'existing' truck electrical system.

Key receptacle 100 is typical and has several distinct key positions. If the truck is equipped with an it can be activated by placing the key in the "ACC" position (accessory position). This action by the driver assumes that the truck will not be driven for some extended period of time, for example, if the driver intends to rest and will make use of the rear bunk area of the cab. By having the key in the ACC position, the driver has access to electrical power for interior lighting, blowers, and other 12 Volt loads.

If heating is required, the driver can press the manual heater switch 130. This will start a diesel fuel fired heater 131 which heat coolant and circulate it to the rear heat core to heat the cabin. The diesel fuel for the heater 131 is obtained from the main engine fuel system. Heater relay 132 is a safety relay that prevents heater 131 from being activated when the truck is in motion.

If the driver requires air conditioning while the truck is stopped, he/she can request it by pressing the AC switch 133. This sends an AC signal via the AC Request Relay 133a and AC Cycling relay 134 to the AC clutch 142 to engage the AC compressor to the ABDS belt drive 7. The same signal enables the motor 1 by energizing the Enable/Disable Relay 104. The motor then rotates the belt on the ABSD 7 to drive the AC compressor and provide cooled air to the cabin. The AC cycling relay 134 extends the length of time the AC compressor can run off the batteries by disabling the motor 1 whenever the condenser fans 135 are on. This is achieved by energizing relay 134 whenever the condenser fan motors 135 are on via condenser fan relay 134a. Pressure switch relay 135a is used to enable the condenser fan circuit.

Cut-Off relay 117 prevents the condenser motor from coming on when the truck is being driven. LVD (low voltage disconnect) sensor 145 monitors the battery voltage. If the voltage falls below some predetermined value, the LVD relay 119 is deactivated and shuts down the APU. This strategy ensures that there is always enough energy remaining in the battery to start the truck.

To start the main engine and exit the APU mode, the driver turns the key in receptacle 100 from the ACC position, through the RUN position to the CRANK position to activate the engine starter. After the engine is started, the key goes to the RUN position. This disables all APU functions by energizing ignition relay 103.

If the key in receptacle 100 is in the RUN position it indicates that the main engine is ON. To save fuel the Start/Stop mode can be activated. The Start/Stop mode is utilized for short periods when the driver may be loading or unloading the trailer, stopped for lunch, etc. The driver simply presses the three position switch 200 to the FS (fuel savings) position. This energizes run relay 102 which shuts down the main engine. The CRANK key position is disabled by energizing relay 101. This prevents the driver from restarting the truck with the key instead of through the switch 200. The FS position of 200 allows the air conditioning to be controlled by the truck existing system by activating relay 136. If air conditioning was active and propelled by the main engine before the truck entered the Stop/Start mode, it will continue to operate but will be propelled by the electric motor 1 after entering the Start/Stop mode.

Figure 4A:
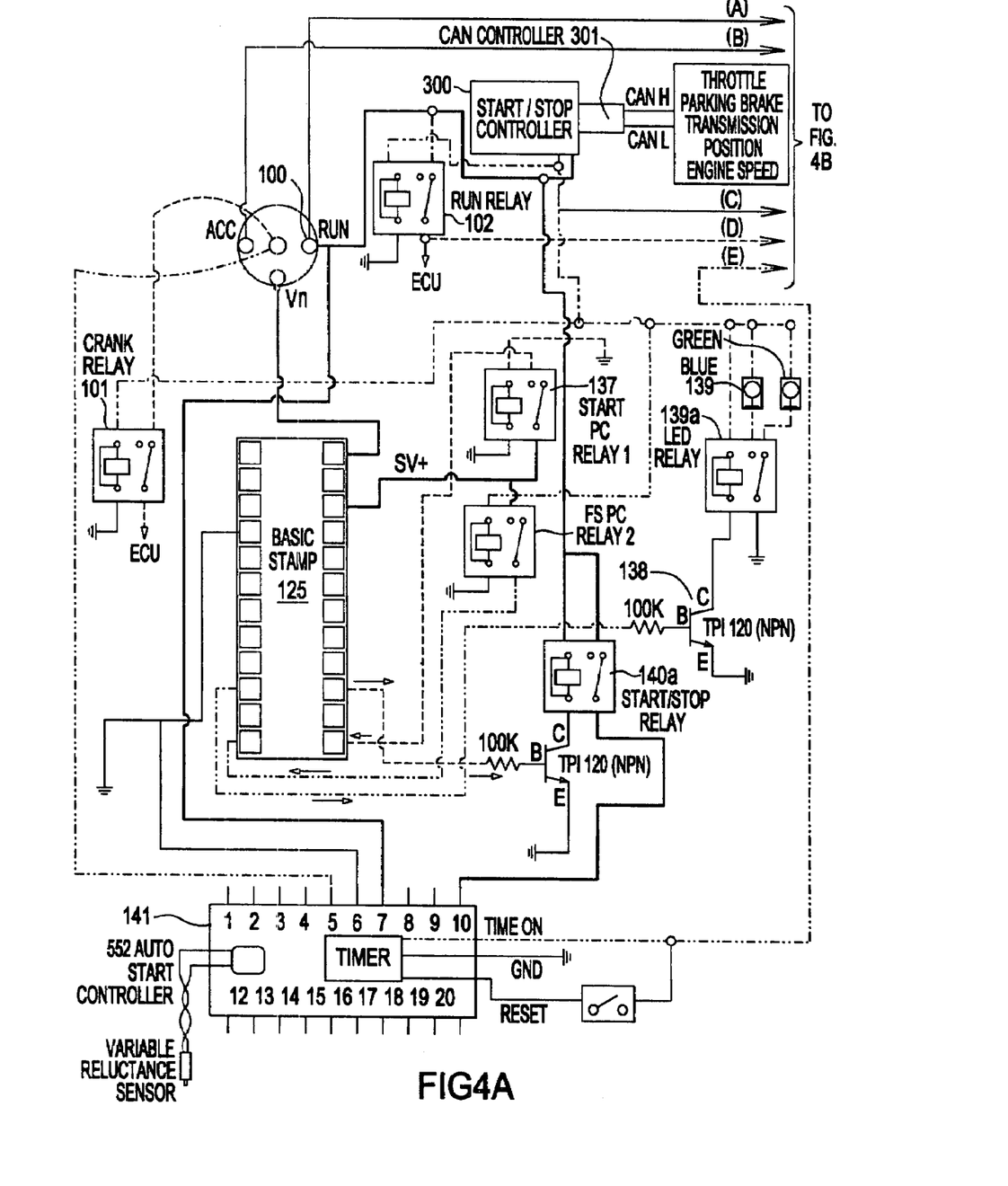
FIG. 4 is an alternate embodiment for the system shown in FIG. 3.
Figure 4B:
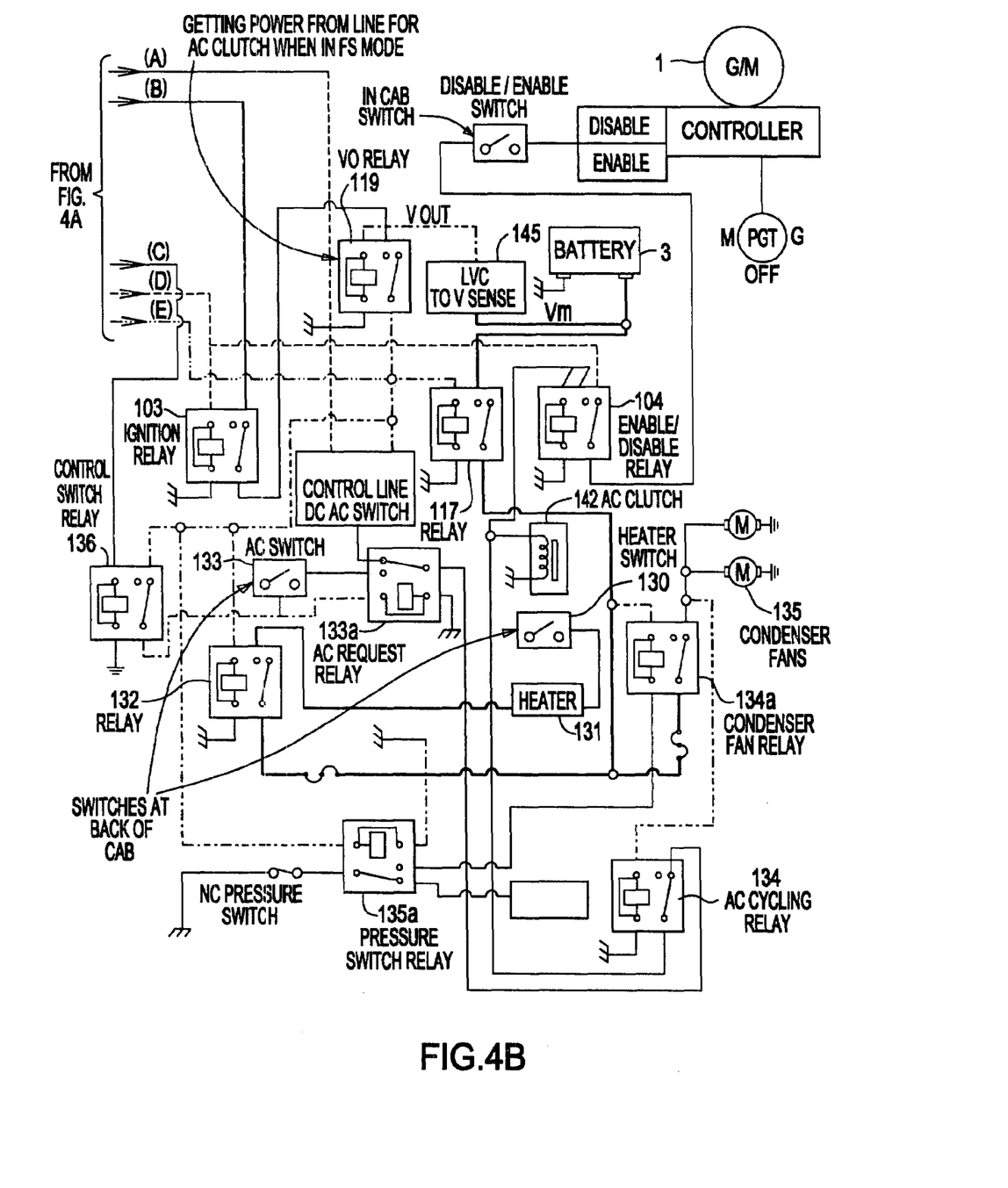

In an alternate embodiment shown in FIG. 4, throttle position, parking brake and transmission status are monitored. This embodiment of the start stop system requires no active interaction by the driver for the system to function. Switch 200 is replaced by start/stop controller 300 and controller area network CAN controller 301. As an example of one scheme, if the vehicle speed is zero and the transmission is in park, the main engine will shut off automatically. When the driver intends to drive again, stepping on the brakes before shifting the transmission to "drive" or "reverse" would cause the main engine to restart. Information about the state of the vehicle, for example the brakes and transmission, is available on the trucks CAN system (known in the art) which is accessed by the CAN module 301. The controller 300 accesses the information in the CAN module to determine if the right conditions are available to stop and restart the engine.

If the heat was on before the Start/Stop mode, the system will continue to circulate hot coolant to the front heater core after the shutdown to provide heat.

If the driver wishes to exit the start/stop mode with the intention of driving again, he/she momentarily presses the start on button 200. Run relay 102 and crank relay 101 become deactivated in preparation for a start event. The momentary press of 200 sends a 12V pulse to the start PC relay 137 which in turn sends a 5V pulse to the supervisory microprocessor 125. This microprocessor turns on transistor 138 to illuminate the blue LED 139 via LED relay 139a, and to turn on transistor 140. Transistor 140 allows a signal to flow via stop start relay 140a to pin 10 of the ES52 engine start controller 141. The controller 141 sends a crank signal to the crank terminal on the key receptacle 100 to engage the starter solenoid and start the main engine.

After the engine has reached a predetermined cranking speed the controller assumes the engine has started and halts the cranking process. The supervisory microprocessor removes the signal to transistor 138 and shuts off the start controller 141. The system is now ready for another Start/stop event.

It is possible to further enhance the fuel savings by implementing regenerative braking with the inventive start/stop system. Regenerative braking recaptures some of the energy that would otherwise be wasted as heat in the brakes and stores it within the onboard batteries 3.

Figure 5:
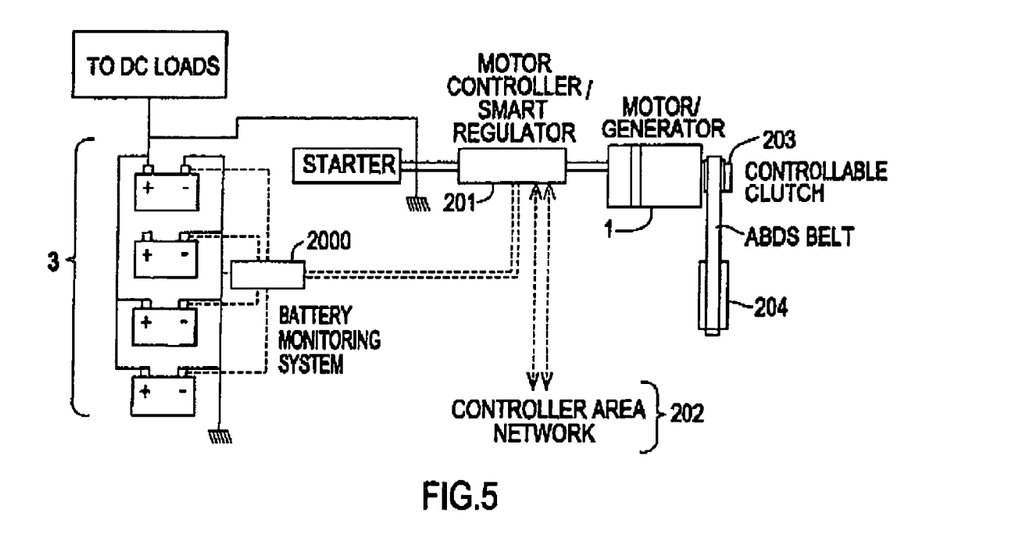
FIG. 5 is a general arrangement schematic of the regenerative braking system.

Although the logic and controls for the start/stop system with regenerative braking was described and constructed in a particular manner, there are other schemes the will give the same control objectives. Referring to FIG. 5, the regenerative system consists of a battery monitoring system 2000 that monitors the state of charge (SOC) of the batteries 3 by measuring parameters such as the voltage, battery temperature, and ambient temperature. This information is communicated to the motor controller/smart regulator 201. The motor controller/smart regulator (MCSR) 201 controls the regenerative system. It receives information from the battery monitoring system and the controller area network (CAN) bus system 202. The MCSR information received over the CAN bus includes brake pedal status, the vehicle speed, the mount of braking required based on pedal position, the state of the transmission, and so on. Using information from the battery monitoring system, the MCSR then determines how much current can be fed back to the batteries 3 during the regenerative braking process.

The state of charge of the battery pack will be maintained between some lower limit (i.e. approximately 70% charged) and the upper limit of fully charged (at or about 100% charged).

During driving, energy is being removed and added to the batteries. To illustrate, as the vehicle is driven, the 12V DC loads such as blower motors and windshield defrosters consume electrical power while the generator charges and replenishes the batteries. Generator 1 is driven by the ABDS belt which is in turn driven by the engine crankshaft 204. During braking events, some of the kinetic energy of the vehicle is electrically recovered through regenerative braking by using otherwise wasted brake energy to propel the generator 1 and thereby provide electricity (current) to recharge the batteries 3.

Figure 6:
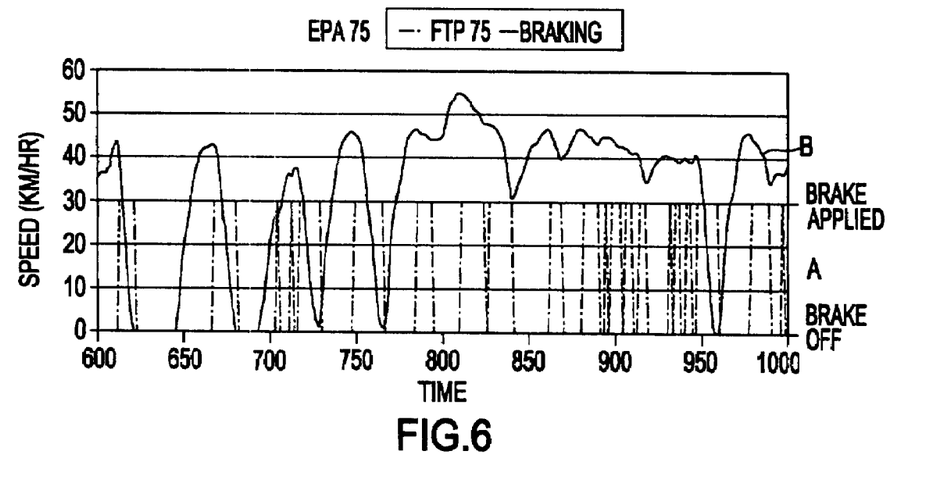
FIG. 6 is a portion of a vehicle driving cycle.

A portion of a driving cycle is shown in FIG. 6. During periods of deceleration when the brake is applied (curve A) regenerative braking will take place. Vehicle speed is shown by curve B. When the vehicle is in the shut down mode (portion of the driving cycle with zero speed), the batteries cease being charged and instead are drained by supplying current to the DC loads, and driving the motor to propel the AC compressor.

If the state of charge (SOC) of the battery is between the lower limit and the upper limits, both the generator and the regenerative braking are used to replenish battery energy. If the battery becomes fully charged, the generator can be disconnected from the ABDS by disengaging the electromagnetic clutch 203 in FIG. 5. This enhances fuel savings since no engine torque is used to drive the generator when the clutch is disengaged. Whenever the brakes are applied clutch 203 can be temporarily reconnected to facilitate regenerative braking (in essence "free energy" to recharge batteries since no fuel is used).

When the generator 1 is disconnected from the ABDS drive and not charging the batteries, the SOC of the batteries could steadily decrease to some lower limit over time, for example ~12.0 volts. At the lower limit, the generator clutch 203 can again be engaged to allow recharge of the batteries.

Figure 7:
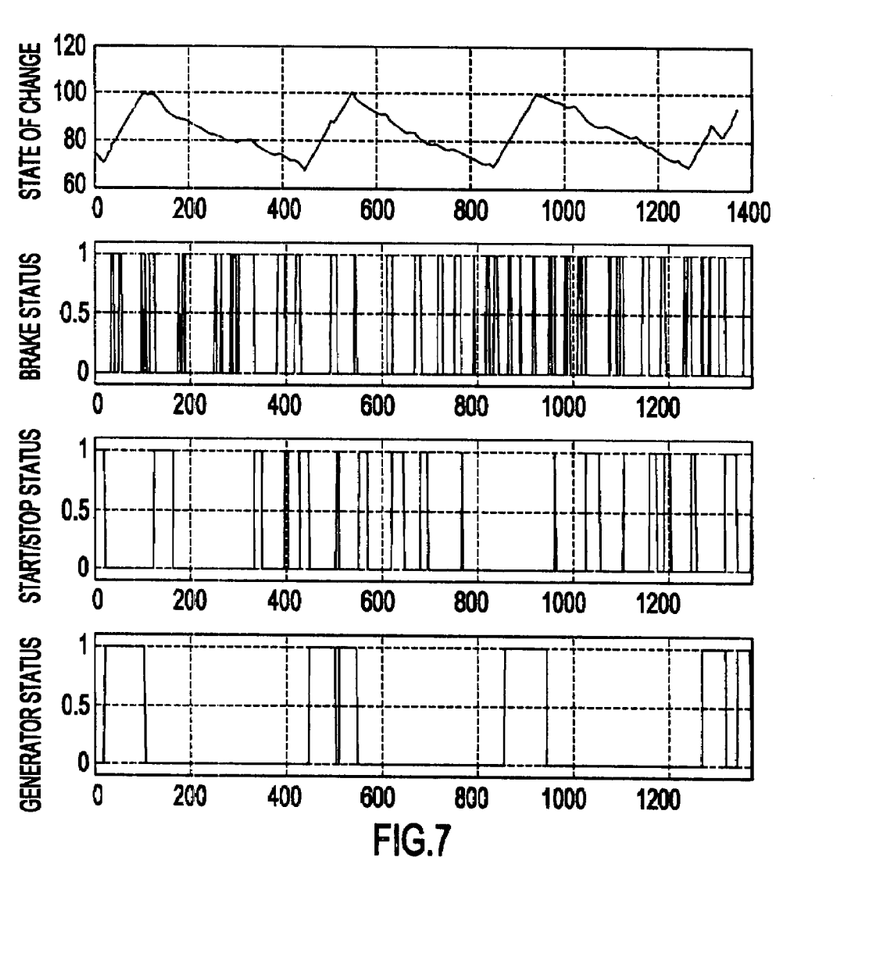
FIG. 7 is an illustration of system parameters for a given drive cycle.

At any time the vehicle can go into a shut down mode and the SOC will decrease, especially if the AC compressor is engaged. The operation described above is demonstrated in FIG. 7. A status value of "1" indicates that that particular system is active. As an example, after the state of charge (SOC) reaches 100%, the Generator Status goes from a value of "1" to a value of "0" indicating that the generator clutch 203 is disengaged from the ABDS. Brake status of "1" indicates the brake is being depressed and regenerative braking is possible, and a Start/Stop status of "1" indicates the vehicle is shut down and all power comes from the battery.

Although forms of the invention has been described herein, it will be obvious to those skilled in the art that variations may be made in the construction and relation of parts and method without departing from the spirit and scope of the invention described herein.

We claim:

1. A vehicle engine stop/start system with regenerative braking comprising:
   a main engine for powering a vehicle having an accessory belt drive system;
   a motor/generator engaged with the accessory belt drive system;
   a key receptacle connected to the stop/start system;
   in a first operating mode an electric energy storage portion for providing electric power to a heating system when the main engine is off;
   a relay for preventing operation of the heating system when the main engine is running;
   in a second operating mode the electric energy storage portion providing electric power to the motor/generator whereby the motor/generator drives an air conditioning compressor when the main engine is off, the air conditioning compressor connected to the accessory belt drive system;
   a relay for preventing operation of the air conditioning compressor using the motor/generator when the main engine is running;
   in a third operating mode the motor/generator is used to start the main engine after the main engine has been automatically stopped; and
   in a fourth operating mode during operation of the main engine the motor/generator generates an electric current during vehicle braking whereby the electric energy storage portion is recharged.

2. The vehicle engine stop/start system with regenerative braking as in claim 1 wherein the electric energy storage portion comprises a battery.

3. The vehicle engine stop/start system with regenerative braking as inn claim 1 further comprising:
   a CAN controller;
   a throttle position sensor detecting a throttle movement; and
   the throttle position sensor sending a signal to the CAN controller whereby the main engine is automatically started upon receiving the throttle position sensor signal.

4. The vehicle engine stop/start system with regenerative braking as in claim 1 further comprising:
   a CAN controller;
   a brake position sensor detecting a brake position;
   the brake position sensor sending a signal to the CAN controller whereby the main engine is automatically started upon receiving the brake sensor signal.

5. The vehicle engine stop/start system with regenerative braking as in claim 1 further comprising:
   a CAN controller;
   a transmission status sensor;
   the transmission status sensor sending a signal to the CAN controller whereby the main engine is automatically started upon receiving the transmission status signal.

6. The vehicle engine stop/start system with regenerative braking as in claim 1 further comprising an auxiliary power unit engaged with the accessory belt drive belt.

7. The vehicle engine stop/start system with regenerative braking as in claim 1 further comprising an operator activated switch for selecting a start-stop operating mode.

* * * * *